(12) United States Patent
Voisin et al.

(10) Patent No.: US 8,758,072 B2
(45) Date of Patent: Jun. 24, 2014

(54) MARINE DEVICE

(75) Inventors: Noel Voisin, Lorient (FR); Alexis Duboue, Carquefou (FR); Michael Gobin, La Ciotat (FR); Alain Fidani, Marseilles Cedex (FR); Stephane Tollet, Marseilles (FR)

(73) Assignee: Sercel, Carquefou (FR)

(*) Notice: Subject to any disclaimer, the term of this patent is extended or adjusted under 35 U.S.C. 154(b) by 126 days.

(21) Appl. No.: 13/344,841

(22) Filed: Jan. 6, 2012

(65) Prior Publication Data
US 2012/0184161 A1    Jul. 19, 2012

(30) Foreign Application Priority Data
Jan. 7, 2011  (EP) ..................................... 11305020

(51) Int. Cl.
*B63B 22/04*      (2006.01)
(52) U.S. Cl.
USPC .............................................. 441/1; 441/23

(58) Field of Classification Search
USPC ............ 441/1, 21, 22, 23, 24, 25, 26, 27, 28, 441/29; 114/331
See application file for complete search history.

(56) References Cited

U.S. PATENT DOCUMENTS

| 2,422,337 | A | * | 6/1947 | Chilowsky ...................... 441/28 |
| 4,004,265 | A | | 1/1977 | Woodruff et al. |
| 5,228,406 | A | | 7/1993 | Marini et al. |
| 6,463,800 | B2 | * | 10/2002 | Fowler ............................ 441/28 |

FOREIGN PATENT DOCUMENTS

EP        1385022 A1    1/2004

* cited by examiner

*Primary Examiner* — Lars A Olson
(74) *Attorney, Agent, or Firm* — Bachman & LaPointe, P.C.

(57) ABSTRACT

A marine device has a floating buoy containing electronics, a submerged payload containing electrical devices and electronics, a power source and a mooring line. At least a part of the power source is submerged and electrically connected to at least one of the submerged payload and the floating buoy, and the mooring line extends between the buoy and at least one of the power source submerged part, the submerged payload and a submerged anchor having a mass allowing it to stay under the water surface.

15 Claims, 4 Drawing Sheets

MARINE DEVICE

BACKGROUND

There is concerned a marine device adapted for cooperating with a submerged payload, such as an elongated subsea cable adapted to record seismic and/or electromagnetic data and transfer said data to a processing unit which can be located on a ship.

Should be already known such a marine device comprising:

a floating buoy having a mass allowing it to float at the surface or near the surface of water and containing electronics including at least one of first electrical means and electronics, a submerged payload at least a part of which has a mass allowing it to stay under the water surface and containing at least one of second electrical means and electronics.

a power source, and a mooring line.

Difficulties remain concerning anchoring the submerged payload, maintaining the floating buoy at or near the surface of water, while the buoys are now more and more heavy and large. Their overweights are related at least notably to increase of electrical power requirements. Further, allowing the submerged payload to be precisely located, or localizable, especially in deep water, is important.

SUMMARY OF THE INVENTION

For overcoming at least some of the above drawbacks, it is presently recommended that:

at least a part of the power source is submerged and electrically connected to at least one of the submerged payload and the floating buoy and, the mooring line extends between the surface floating buoy and at least one of the power source submerged part, the submerged payload and a submerged anchor having a mass allowing it to stay under the water surface, for preventing the floating buoy from drifting beyond a determined area.

Preferably, the submerged anchor will include at least a part of said power source submerged part. As a consequence, said power source submerged part will possibly be used as dead weight.

If, as recommended, the submerged anchor is connected to the mooring line, retaining the floating buoy and preventing it from drifting will be easier than before.

Same effect if at least one of the power source submerged part and the submerged anchor has a mass allowing it to lay down on seabed and the surface floating buoy is mechanically connected therewith.

Same effect if the power source includes at least one electrochemical battery cell and said (submerged part) power source is used as dead weight.

If the floating buoy and submerged payload are connected through at least one of a wireless connection and a cable (electrical or optical) connection, collecting data from the payload (such as recorded seismic data or electromagnetic data) and/or allowing the data transmitter to transmit such data will be allowed.

If the submerged payload comprises an elongated subsea cable and said at least one of the second electrical means and electronics comprises at least one of a seismic sensor and an electromagnetic sensor, such a sensitive payload should take advantage of both an improved power source (higher power capacity) and a stabilized buoy offering higher electronics and/or transmission capacities.

According to another aspect, it is recommended that the mooring line be adapted for passing therethrough at least one of electrical, hydraulic and pneumatic powers, data (seismic or electromagnetic data) and fluid. Such a dual (mechanical and other) function mooring line will improve the safety and efficiency of the marine device.

Such advantages will also be reached if the mooring line comprises at least one of a cable (electrical or optical) adapted to transmit seismic or electromagnetic data, also called data cable later on description, and an electrical cable adapted to supply the power for said submerged payload.

It is also an advantage if the mooring line is flexible over at least a major portion of its length, so as to define a common cable line adapted to both electrically and mechanically connect the floating buoy and at least one of the submerged anchor, the submerged payload and the power source submerged part. An improved control of the mechanical stress (especially on the buoy) should also be reached.

If the submerged payload is connected to the power source submerged part through at least one of a splitter and a jumper, different ways of connecting the elements will be available.

According to a further aspect, the marine device will further comprise at least one mid-water buoy having positive buoyancy and disposed at or connected to an intermediate portion of the mooring line, for allowing it to float under the water surface. This will improve the ability of controlling (limiting) the mechanical stresses, especially those soliciting the floating buoy.

According to another aspect, the submerged anchor will comprise a plurality of submerged anchors located on seabed. A drifting prevention in different directions will thus be reached.

According to a further aspect, the submerged anchor will preferably include materials including at least one of:

said power source submerged part, and at least one of (third) electrical means and electronics.

As a consequence, the submerged anchor(s) will have at least a dual function: dead weight and power/communication/processing function.

The above-mentioned architecture can present several advantages compared to a more classical one in which active components of the weight are in the surface buoy:

lighter and smaller buoy, possibility to use energy sources that could not be used on a moving/dynamic buoy, power sources being heavy elements, their mass is used as part of the dead weight, better cooling of power source and at least some electronics in cold subsea water, away from direct sunlight, if elements to be powered are subsea the energy source (in the weight) is closer, hence limiting voltage drops and energy losses.

BRIEF DESCRIPTION OF THE DRAWINGS

The following description discloses various details in relation to different embodiments shown in drawings, which are given by way of illustration only, and thus are not limiting the invention, and wherein.

DETAILED DESCRIPTION OF THE PREFERRED EMBODIMENT(S)

Through the figures is detailed a marine device 1 including specifications in conformity with the invention and adapted to be disposed in water.

Figure 2:
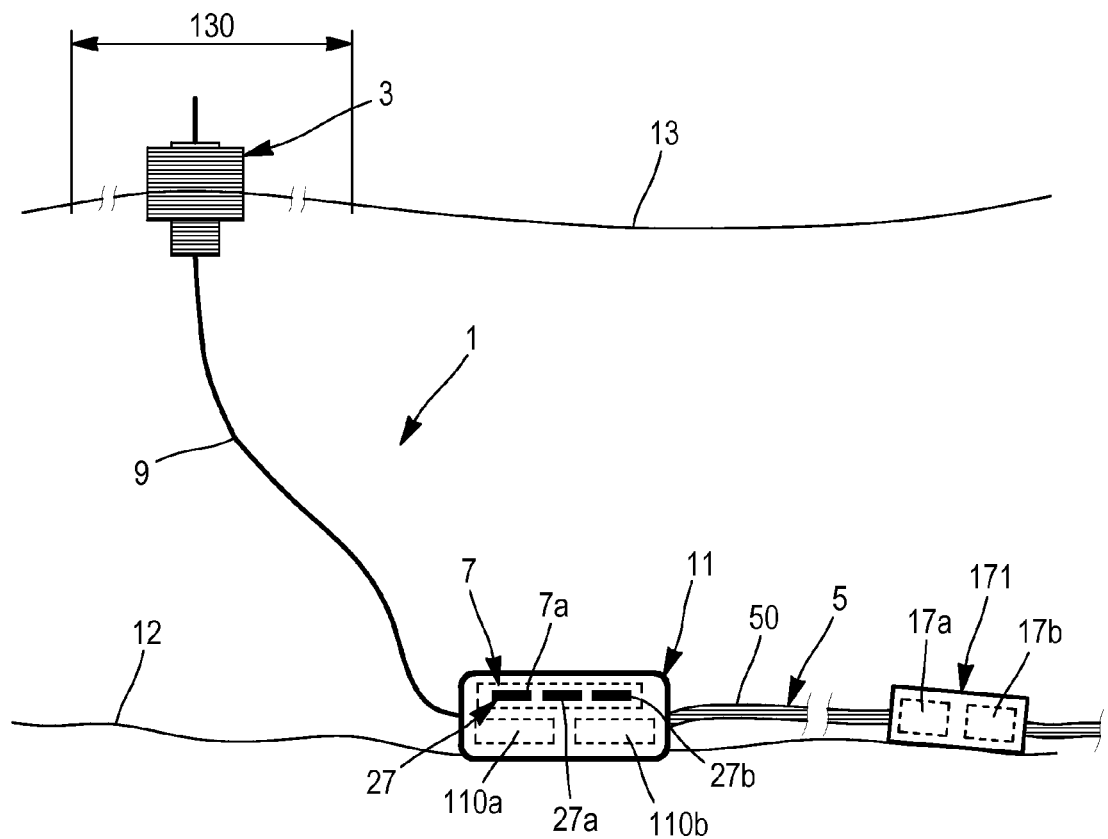

The marine device 1 comprises a floating buoy 3, a submerged payload 5, a power source 7 at least a part of which, 7a, is submerged, and a mooring line 9 extending between the floating buoy 3 and at least one of the power source submerged part 7a, the submerged payload 5 and a submerged anchor 11; see FIG. 2.

It must be clear that the expression "buoy" covers any shape of buoy, including for example a platform shape, provided that said platform has a floating capacity.

Figure 6:
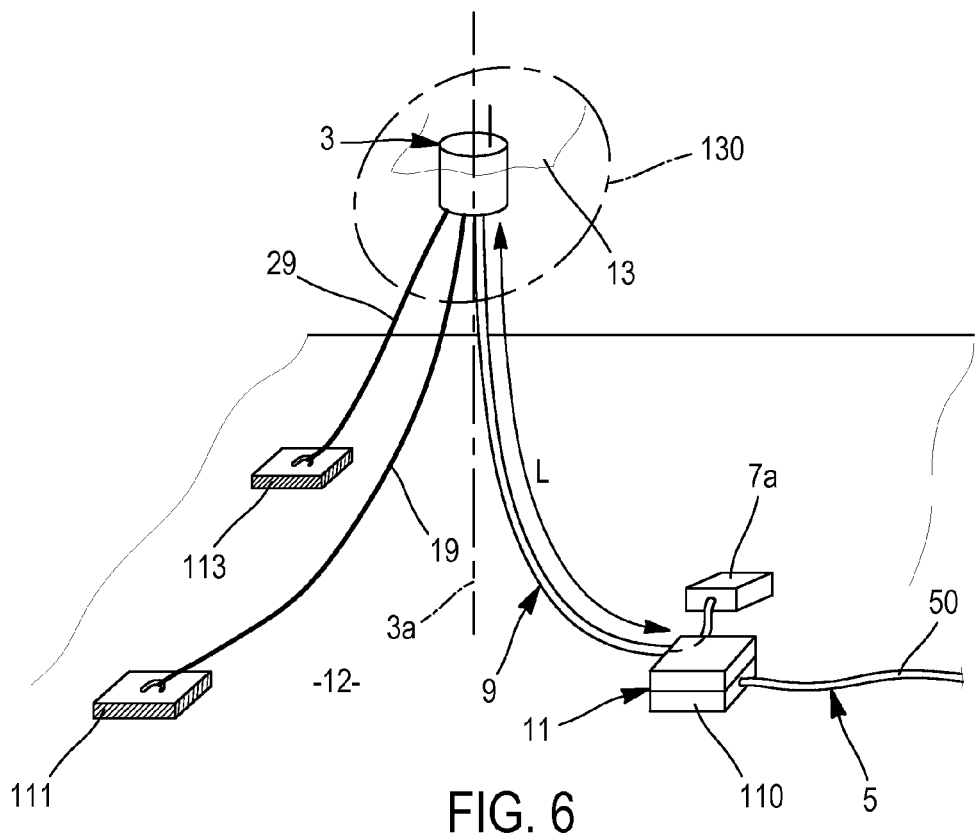

The submerged anchor 11 has a mass allowing it to stay under the water surface 13, for preventing the floating buoy from drifting beyond a determined area referenced 130 FIGS. 2, 6.

For allowing the power source to have at least a part thereof submerged under the sea level, it is recommended that said submerged part 7a be disposed:

on the sea bed 12 and preferably connected to the floating buoy 3 and/or the payload 5, through (at least a part of) the mooring line 9, and/or under the water surface 13, possibly as a mid-water component, and connected to the submerged anchor 11, and preferably to the payload, through (at least a part of) the mooring line.

Another recommendation relates to the fact that said submerged part of the power source be an (independent) structure completely submerged, with no reaching the sea level, said completely submerged structure being connected to the submerged payload 5 and/or the anchor 11, through the mooring line or an other cable.

Figure 7:
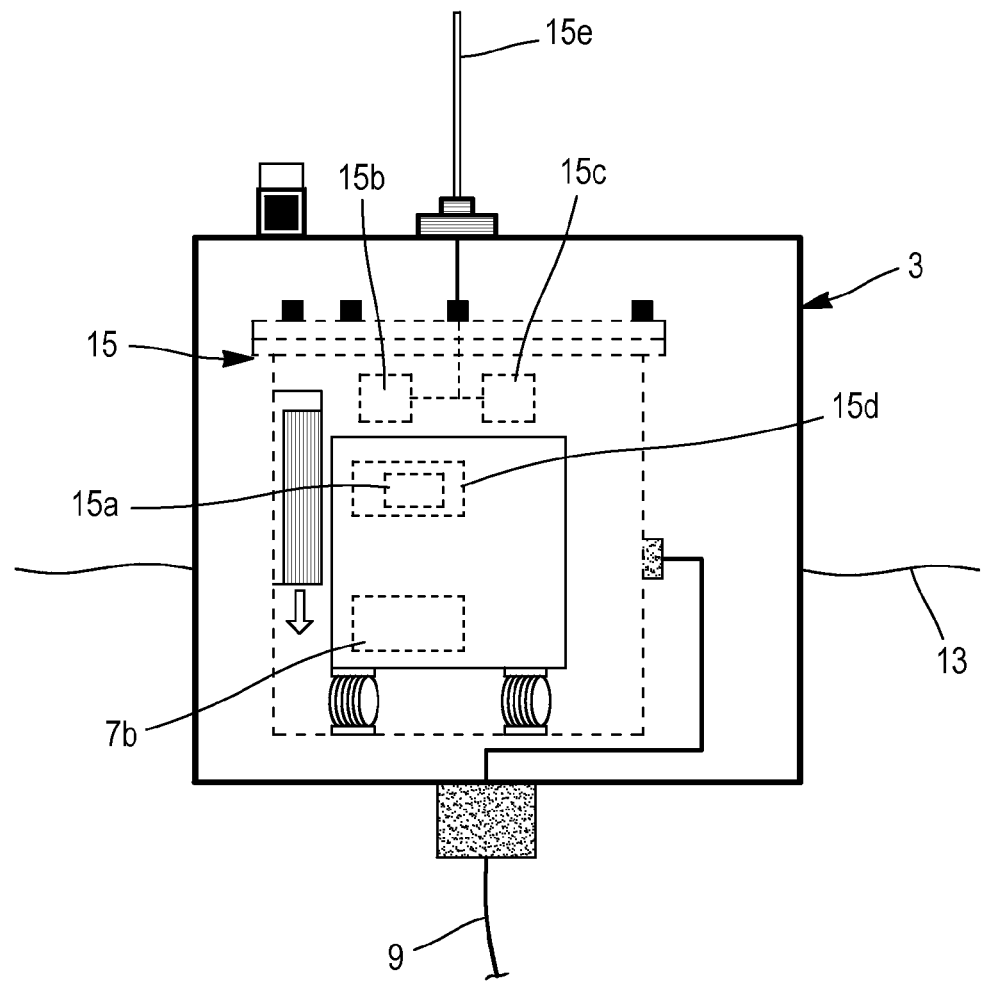
FIG. 7 shows details about the buoy, according to one embodiment, FIGS. 8, 9 schematically illustrate a portion of mooring line according to two different embodiments.

The floating buoy 3 contains electrical means and electronics 15 including a data logger 15a, a data receiver 15b and a data transmitter 15c (see FIG. 7). Said buoy 3 has a mass allowing it to float at the surface, or near the surface 13 of water (just below).

In the illustrations, the submerged anchor 11 comprises at least one heavy block. FIG. 6, it comprises a plurality of submerged anchors 110, 111, 113 located on seabed 12. Disposing such a plurality of submerged anchors radially around a vertical axis 3a passing by the floating buoy 3 will prevent it from excessively drifting in different directions more closely. As illustrated FIG. 6, the so-called mooring line 9 can be one of the respective cable links 9, 19, 29 which (at least) mechanically connect the buoy 3 to the respective dead weights, or passive anchors, 110, 111, 113. In the illustration, cable links 19, 29 are mechanical links, only.

The submerged payload 5 has also a mass allowing it to stay under the water surface 13. It contains at least one of electrical means and electronics 17a, 17b, such as sensors, data transmitter, switches, . . . .

Specifically, in the illustrated embodiment, the submerged payload 5 comprises an elongated subsea cable 50. And said at least one of electrical means and electronics 17a, 17b comprises at least one sensor 170a, like seismic sensor (geophone or hydrophone for example) and a electromagnetic sensor; see FIG. 3.

To improve the efficiency of the floating buoy 3, the latter and said submerged payload 5 are connected through at least one of a wireless connection and a cable (electrical or optical) connection.

Figure 3:
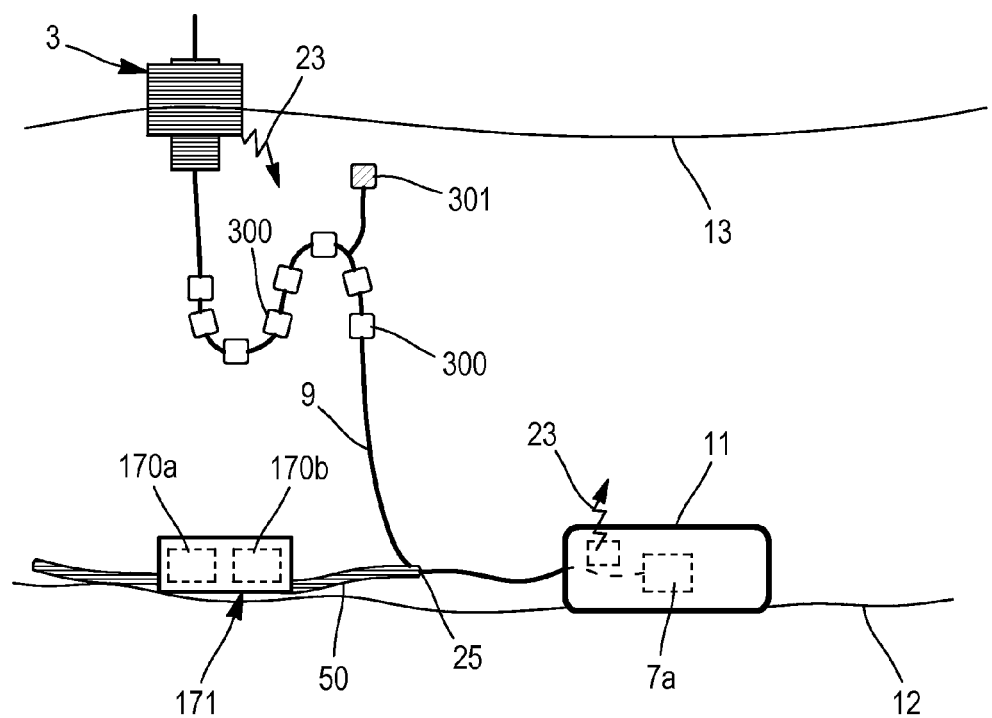

FIG. 3, reference 23 shows such a wireless connection.

In the illustrations, cable 50 has a weight allowing it to lay down on seabed 12 over at least the major part of its length.

If the submerged payload comprises an elongated subsea cable 50, the latter can be a cable of a seismic survey system. The sensor unit of such a cable typically includes at least one of a electromagnetic sensor and a seismic sensors, these lasts allowing to detect particle motion waves (geophones) and/or pressure waves (hydrophones). A decoupling device can substantially mechanically uncouple the sensor unit from the cable.

Thus, with such a marine cable having a sensor unit, detection of reflected acoustical energy can be obtained.

As a consequence, marine cable 50 can be used in a seismic survey conducted by a vessel towing an acoustic source close to a water surface. This source emits acoustical energy, typically in the form of pressure waves (p-waves), that penetrates a geological formation of interest below a seabed or mud line (often called "subsurface formation"). Some of the emitted energy is reflected when the pressure waves pass through the boundaries between the different layers in the ground. A network of sensors (e.g., hydrophones) mounted in one or more cables registers reflected acoustical energy in the form of p-waves. These cables are typically towed in conjunction with or separately from the acoustic source. Conventionally, the hydrophones are pressure sensitive electrical sensors that generate electrical signals corresponding to the detected acoustical energy.

Parts of the energy in the emitted p-waves are reflected as shear waves (s-waves). By registration of the s-waves one can get additional information about the subsurface formation. S-waves propagate only through solids, not liquids. Therefore, the sensors configured to detect s-waves are ideally placed at the seabed to record this type of signals. This is known technology, and the method is amongst other described in U.S. Pat. No. 4,725,990. The sensors that are used have to be motion sensitive (e.g., geophones or accelerometers).

Figure 1:
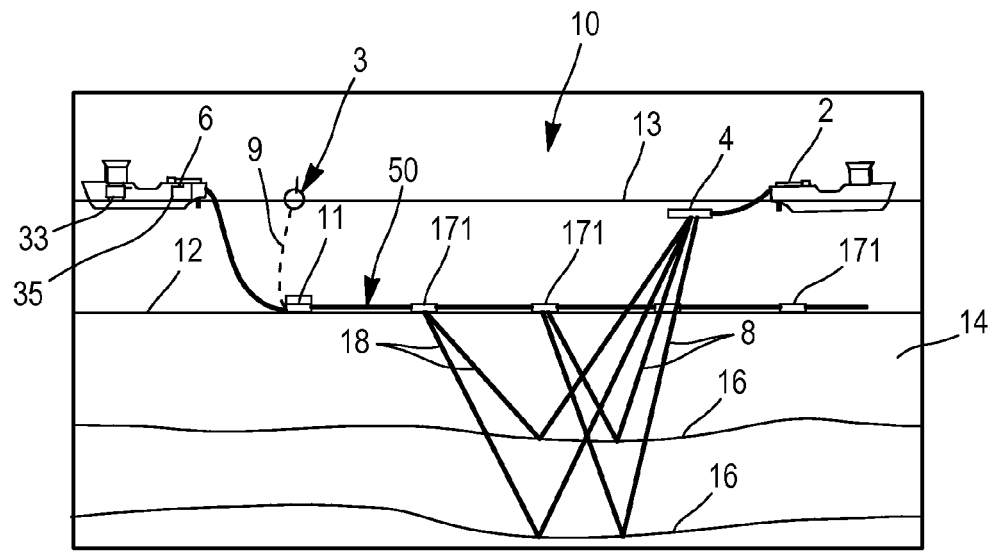
FIG. 1 schematically illustrates a marine seismic survey system arranged according to one embodiment, FIG. 2 schematically illustrates a marine device arranged according to one embodiment, FIGS. 3, 4, 5 schematically illustrate marine devices arranged according to different embodiments, FIG. 6 schematically illustrates an alternative embodiment for anchoring the buoy.

FIG. 1 shows an exemplary embodiment of a marine seismic survey system 10 for recording seismic or electromagnetic data. The preferred system 10 includes a first vessel 2 for towing a seismic source 4 such as an air gun array and a second vessel 6 for deploying cable 50 with sensor units 171 at the seabed 12. Alternatively, the survey can be performed with one vessel. For example, a vessel can deploy the sensor cable 50, which can include tethering or hooking up the sensor cable 50 to a substantially stationary installation, which can be buoy 3, in a pre-selected area. By substantially stationary, it is meant that the movement of the sensor is restricted to a predefined range or perimeter. The buoy can be fitted with a suitable data recording system 15d (FIG. 7). Thereafter, the same vessel can deploy the seismic source. Thus, in such an alternate arrangement, the cable-deployment vessel and the source-towing vessel are the same vessel.

Regardless of the particular arrangement used, and as illustrated FIG. 1, the seismic source 4, upon deployment, emits acoustic pulses or pressure waves ("p-waves"), illustrated by line 8, that propagate through the water and the different layers of a subsurface geological formation of interest 14. Some of the energy in the emitted energy 8 is reflected from the boundaries between the different layers in the subsurface formation 16. These boundaries are sometimes referred to as "reflectors" having different acoustic impedances. The reflected acoustical energy will partly be shear waves ("s-waves") and partly p-waves, and are illustrated by line 18. The reflected energy is detected by the sensor units 171, which transmit responsive signals to a recording system (not shown) onboard the vessel 6. These signals are recorded, processed and analyzed by known techniques.

The above details are disclosed in EP-A-1385022.

Vessel or ship 6 can accordingly be provided with a processing unit 33 and a communication unit 35 (FIG. 1) for recovering data from the payload (such as seismic data), possibly through the data transmitter 15c, the data receiver 15b, and the data logger 15a, via antenna 15e of the buoy 3.

The submerged anchor 11 can be, or include, one or more heavy dead weight, such as a block of concrete. However, it is recommended that the submerged anchor 11 includes materials including at least one of:

said power source submerged part 7a, and at least one of electrical means 110a and electronics 110b; see FIG. 2.

Electrical means 110a can be switches, pumps, generator; electronics 110b can be loggers, data memories, communication unit for communication with buoy 3, . . . .

Preferably, such means will include an electric power unit (referenced 27 below), electronics and communication means which can be used to power and communicate with buoy 3, and possibly any other subsea system connected to the submerged anchor 11.

Functions of submerged anchor 11 are included in the following:

providing anchoring function to the buoy 3, by acting as a dead weight;

providing electric power to the buoy and/or the payload;

providing communication means if needed, for controlling communications between the various components of the system.

Figure 4:
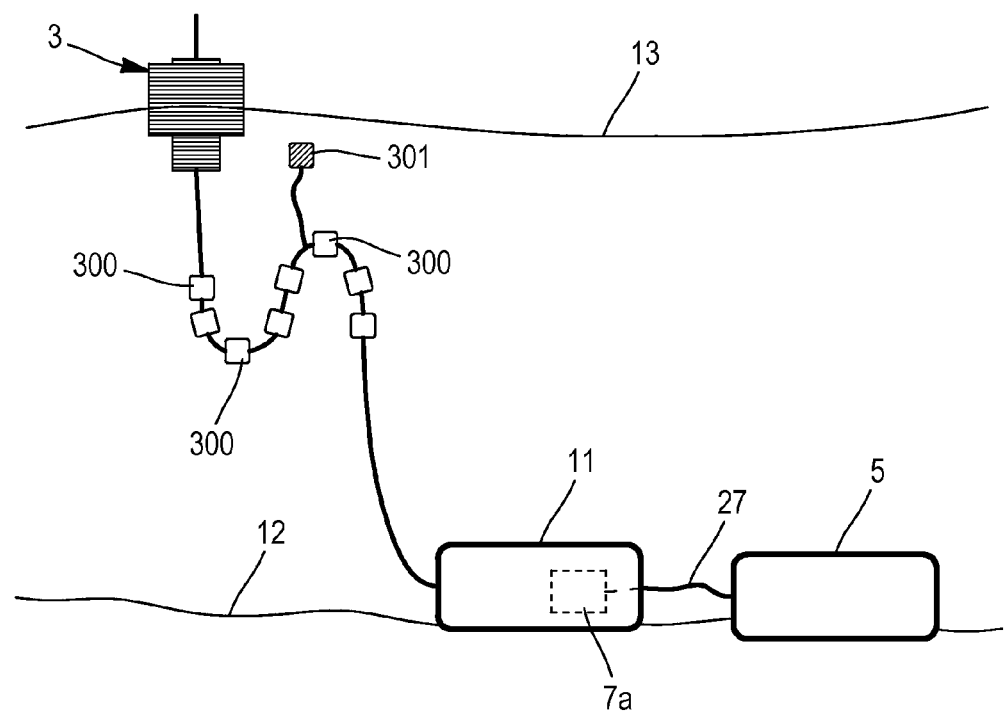

Functions of the buoy 3 are included in the following:

providing localisation means for easy recovery with the support vessel 6,2;

providing communication means between the support vessel and the submerged anchor 11, for monitoring and/or quality control;

providing communication means by wireless, optical or electrical communication between the buoy 3 and any subsea equipment as submerged anchor 11 and/or payload 5 (FIG. 4 depicts, for example, one embodiment with wireless means 23 for communication);

providing localization/recovery means for easy retrieval at the end of the mission or the installation operation of the payload 5;

embedding any equipments, electronics, . . . and even possible light energy source (wind turbine and/or solar unit 7b . . . ) that are would not be integrated in anchor 11.

The following components could be housed in buoy 3: Wireless communication means (HF radio, Wifi, etc. . . . ), Wired communication means (Ethernet, USB, FireWire IEEE1394, or any other protocol), optical or electrical communication means for data communication, light power supplies or conversion systems, data logger, computer or microcontroller.

Basically, it is not necessarily requested that the submerged payload 5 and the submerged power source 7a be connected. The submerged power source 7a could also be used for powering the active components of electrical means and electronics 15 of the buoy 3, while being involved in the anti-drifting action.

As above-mentioned, another part of the electrical power source, 7b, can be maintained within the buoy 3; see FIG. 7. It is however a minor part of the global power source 7.

As illustrated FIG. 2, both the power source submerged part and the submerged anchor 11 will preferably have a mass allowing them to lay on seabed 12, for preventing drifting of the buoy 3, as explained.

For providing at least a part of the electrical power to the device, the electrical power source submerged part 7a is electrically connected to the submerged payload 5 and the floating buoy 3.

Such a connection can be direct or indirect.

Advantageously, the power source will include one or more electrical battery 27.

FIG. 2 shows, as elements of part 7a, a lead-acid battery cell 27a and a fuel cell 27b which are both electrochemical batteries. Only one of them can be used.

For the previously cited mechanical and/or communication and/or electrical requirements (and possibly others), the mooring line 9 extends between the floating buoy 5 and at least one of the power source submerged part 7a, the submerged payload 5 and the submerged anchor 11.

Preferably, the mooring line 9 will be connected at one end to the floating buoy 3 and, at the opposite end, to the submerged anchor 11.

Figure 8:
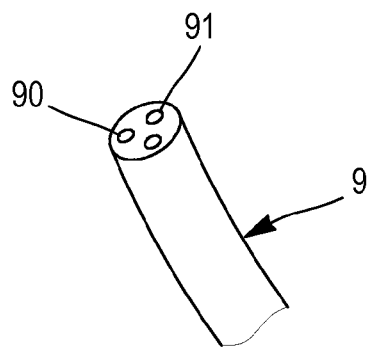

According to FIGS. 6 and 8, the length of the mooring line 9 is referenced L, and said mooring line comprises a cable 90, also called "data cable", adapted to transmit seismic or electromagnetic data through electrical or optical connection, and an electrical cable 91 for supplying electrical power to the submerged payload (for example, in a preferred embodiment).

The mooring line will preferably be flexible over at least a major portion of its length L, so as to define a common cable line adapted to both electrically and mechanically connect the floating buoy 3 and the submerged anchor 11, the submerged payload 5 and the power source submerged part 7a, directly or not.

Figure 9:
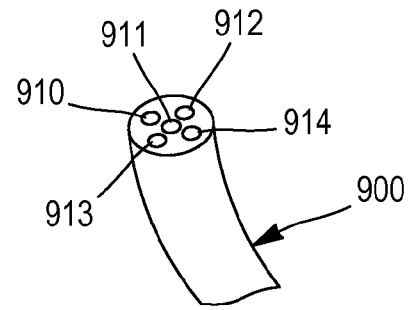

FIG. 9 shows a mooring line 900 adapted for passing therethrough electrical power, through cable 910, hydraulic power, through duct 911, pneumatic power, through duct 912, seismic or electromagnetic data, through cable 913, and fluid (such as water), through duct 914.

The FIG. 3 shows said submerged payload 5 connected to the power source submerged part 7a through the splitter 25.

The FIG. 4 shows said submerged payload 5 connected to the power source submerged part 7a through the jumper 27.

Figure 5:
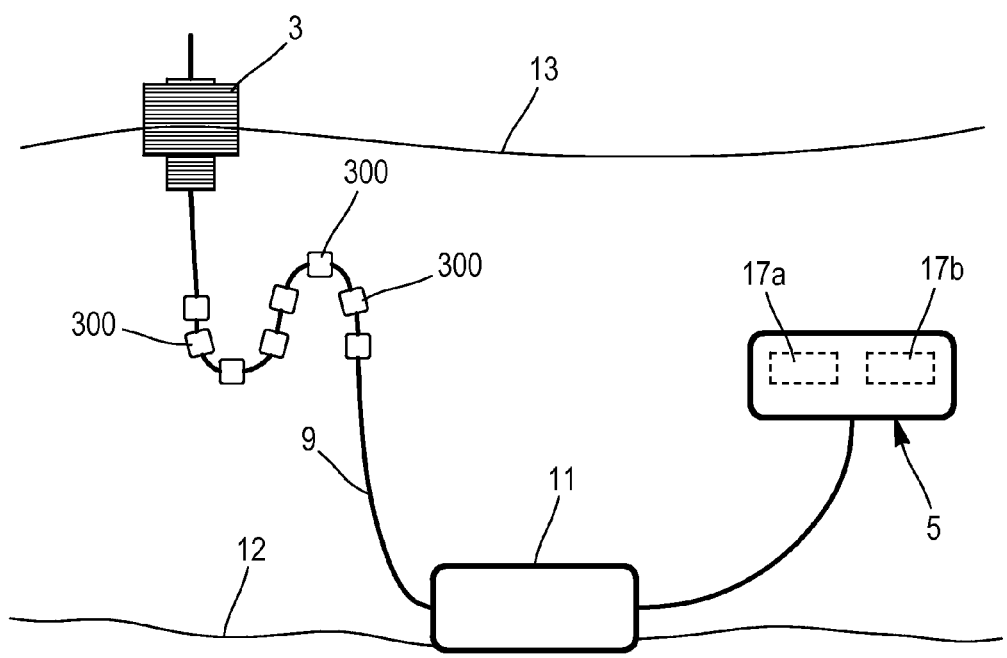

Further, FIGS. 3-5 show embodiments in which the marine device 1 further comprises at least one mid-water buoy 300, 301 (presently, a plurality) having positive buoyancy and disposed at (buoys 300), or connected to (buoys 301), an intermediate portion of the mooring line 9, for allowing it to float under the water surface 13.

FIG. 5, the payload is also a mid-water component.

Furthermore, in said figures, the mooring line has an S-shape, lazy wave, steep wave or lazy S configuration. Consequently, it has a reserve of length adapted for absorbing limited movements and primary stress. Such an over-length prevents the buoy 3 from being excessively stresses via line 9. Other shapes can be retained.

It must be clear that the above-described and illustrated embodiments can mix all or part of their specifications.

It must also be clear that the above-described and illustrated embodiments can be applied to another seismic method using another power source and another sensors, for example electromagnetic power source and electromagnetic sensors.

Further, the above-described marine device will be free of any thruster, including powered thruster, for urging on a cable to hold it in mid-sea. Typically such a thruster is immersed and provided with a propeller (see reference 32 in U.S. Pat. No. 4,004,265). The propeller allows the thruster to hold under water, mid-sea. Connected to a payload, such as hydrophones, disposed on a cable to which the thruster is connected, the propeller of U.S. Pat. No. 4,004,265 can allow said cable to be held in a substantially straight line. In the preferred solution of the invention, such a propeller is useless.

The invention claimed is:

1. A marine device comprising:
    a floating buoy having a mass allowing said buoy to float at a surface or near a surface of water and containing at least one of first electrical means and electronics,
    a submerged payload at least a part of which has a mass allowing said submerged payload to stay under the water surface and containing at least one of second electrical means and electronics,
    a power source having a first part and a second part,
    a mooring line,
    the first part of the power source being submerged and electrically connected to at least one of the submerged payload and the floating buoy,
    the second part of the power source being maintained within the buoy and,
    the mooring line extending between floating buoy and the submerged first part of the power source, the submerged payload and a submerged anchor having a mass allowing said mooring line to stay under the water surface, for preventing the floating buoy from drifting beyond a determined area, wherein the submerged anchor includes at least a part of said submerged first part of the power source.

2. The marine device of claim 1, in which the submerged anchor is connected to the mooring line.

3. The marine device of claim 1, in which at least one of the submerged first part of the power source and the submerged anchor has a mass allowing said at least one of the submerged first part of the power source and the submerged anchor to lay on a seabed.

4. The marine device of claim 1, in which the floating buoy and submerged payload are connected through at least one of a wireless connection and a cable connection.

5. The marine device of claim 1, in which the power source includes an electrochemical battery cell.

6. The marine device of claim 1, in which the submerged payload comprises a submerged cable having a weight allowing said submerged cable to lay on a seabed.

7. The marine device of claim 1, in which the submerged payload comprises an elongated subsea cable and said at least one of second electrical means and electronics comprises at least one of a seismic sensor and an electromagnetic sensor.

8. The marine device of claim 1, wherein said power source is an electromagnetic power source and wherein said at least one of second electrical means and electronics comprises at least one electromagnetic sensor.

9. The marine device of claim 1, in which the mooring line is adapted for passing therethrough at least one of electrical, hydraulic and pneumatic powers, data and fluid.

10. The marine device of claim 1, further comprising at least one mid-water buoy having positive buoyancy and disposed at or connected to an intermediate portion of the mooring line, for allowing said at least one mid-water buoy to float under the water surface.

11. The marine device of claim 1, in which the mooring line has a length, comprises at least one data cable adapted to transmit data and at least one electrical cable, said mooring line being flexible over at least a major portion of said length, so as to define a common cable line adapted to both electrically and mechanically connect the floating buoy and at least one of the submerged anchor, the submerged payload and the submerged first part of the power source.

12. The marine device of claim 1, in which the submerged anchor comprises a plurality of submerged anchors located on a seabed.

13. The marine device of claim 1, in which said at least one of the first electrical means and electronics includes at least one of a data transmitter, a data receiver and a data logger.

14. A marine device comprising:
    a floating buoy having a mass allowing said buoy to float at a surface or near a surface of water and containing at least one of first electrical means and electronics,
    a submerged payload at least a part of which has a mass allowing said submerged payload to stay under the water surface and containing at least one of second electrical means and electronics,
    a power source having a first part and a second part,
    a mooring line,
    the first part of the power source being submerged and electrically connected to at least one of the submerged payload and the floating buoy, in which the submerged payload is connected to the submerged first part of the power source through at least one of a splitter and a jumper,
    the second part of the power source being maintained within the buoy and,
    the mooring line extending between floating buoy and the submerged first part of the power source, the submerged payload and a submerged anchor having a mass allowing said mooring line to stay under the water surface, for preventing the floating buoy from drifting beyond a determined area.

15. A marine device comprising:
    a floating buoy having a mass allowing said buoy to float at a surface or near a surface of water and containing at least one of first electrical means and electronics,
    a submerged payload at least a part of which has a mass allowing said submerged payload to stay under the water surface and containing at least one of second electrical means and electronics,
    a power source having a first part and a second part,
    a mooring line,
    the first part of the power source being submerged and electrically connected to at least one of the submerged payload and the floating buoy,
    the second part of the power source being maintained within the buoy and,
    the mooring line extending between floating buoy and the submerged first part of the power source, the submerged payload and a submerged anchor having a mass allowing said mooring line to stay under the water surface, for preventing the floating buoy from drifting beyond a determined area, in which the submerged anchor includes materials including at least one of:
    the submerged first part of said power source, and
    at least one of additional electrical means and electronics.

* * * * *